United States Patent
Kusserow et al.

(10) Patent No.: US 11,245,313 B2
(45) Date of Patent: Feb. 8, 2022

(54) DRIVE ENGINE ARRANGEMENT WITH SENSOR-MONITORED FAN FOR AN ELEVATOR SYSTEM

(71) Applicant: Inventio AG, Hergiswil (CH)

(72) Inventors: Martin Kusserow, Lucerne (CH); Reto Tschuppert, Lucerne (CH); Philipp Zimmerli, Härkingen (CH)

(73) Assignee: INVENTIO AG, Hergiswil NW (CH)

( * ) Notice: Subject to any disclaimer, the term of this patent is extended or adjusted under 35 U.S.C. 154(b) by 740 days.

(21) Appl. No.: 15/770,293

(22) PCT Filed: Oct. 26, 2016

(86) PCT No.: PCT/EP2016/075864
§ 371 (c)(1),
(2) Date: Apr. 23, 2018

(87) PCT Pub. No.: WO2017/072198
PCT Pub. Date: May 4, 2017

(65) Prior Publication Data
US 2018/0309347 A1     Oct. 25, 2018

(30) Foreign Application Priority Data
Oct. 29, 2015  (EP) .................................... 15192028

(51) Int. Cl.
*B66B 5/00*       (2006.01)
*H02K 11/25*    (2016.01)
(Continued)

(52) U.S. Cl.
CPC ............ *H02K 11/25* (2016.01); *B66B 5/0025* (2013.01); *B66B 11/043* (2013.01); *H02K 9/04* (2013.01)

(58) Field of Classification Search
CPC ........ H02K 11/25; H02K 9/04; B66B 5/0025; B66B 11/043
(Continued)

(56) References Cited

U.S. PATENT DOCUMENTS 5,612,672 A * 3/1997 Ino .......................... F01P 7/048
                                                                 340/449
5,930,736 A * 7/1999 Miller ................... H02P 7/2815
                                                                 318/471
(Continued)

FOREIGN PATENT DOCUMENTS

DE   102009050693 A1   4/2011
JP     2008254909 A   10/2008
(Continued)

*Primary Examiner* — Marlon T Fletcher
(74) *Attorney, Agent, or Firm* — William J. Clemens; Shumaker, Loop & Kendrick, LLP

(57) ABSTRACT

A drive engine arrangement for an elevator system includes a drive engine for driving suspension traction media for displacing an elevator car, a fan for generating a fluid flow for cooling the drive engine and a fluid flow sensor. The fluid flow sensor senses the fluid flow generated by the fan. Accordingly, using the fluid flow sensor, it can be determined whether or not the fan is currently operating. By e.g. comparing the fan's behavior with previous operation patterns and/or by additionally measuring a temperature of the drive engine with a temperature sensor, it can be monitored whether the fan is operating correctly or whether e.g. cooling requirements may be compromised due to a malfunction of the fan. Such monitoring can be performed remotely and/or automatically.

15 Claims, 2 Drawing Sheets

3 DRIVE ENGINE  23 ELECTRIC MOTOR  27 FAN MOTOR  29 POWER SUPPLY CONTROL
33 SWITCH  39 TEMPERATURE SENSOR

(51) Int. Cl.
*B66B 11/04* (2006.01)
*H02K 9/04* (2006.01)

(58) Field of Classification Search
USPC ......................................................... 187/277
See application file for complete search history.

(56) References Cited

U.S. PATENT DOCUMENTS

| | | | | |
|---|---|---|---|---|
| 6,085,873 | A * | 7/2000 | Macchi | B66B 9/04 187/273 |
| 7,142,125 | B2 * | 11/2006 | Larson | F04D 27/004 340/635 |
| 7,239,968 | B2 * | 7/2007 | Fasullo | G06F 1/206 702/58 |
| 8,190,396 | B2 * | 5/2012 | Yanao | G05B 23/0237 702/183 |
| 9,857,433 | B2 * | 1/2018 | Kondo | G01R 19/165 |
| 10,257,959 | B2 * | 4/2019 | Warren | H05K 7/20172 |
| 10,519,960 | B2 * | 12/2019 | Kelly | F04D 29/582 |
| 2001/0024358 | A1 * | 9/2001 | Bonet | H05K 7/20581 361/695 |
| 2006/0130663 | A1 * | 6/2006 | Joshi | B01D 53/007 96/224 |
| 2006/0152891 | A1 * | 7/2006 | Jreij | H05K 7/20209 361/676 |
| 2008/0230326 | A1 * | 9/2008 | Tyni | B66B 5/0031 187/393 |
| 2008/0310967 | A1 * | 12/2008 | Franz | G06F 1/20 417/32 |
| 2010/0076728 | A1 * | 3/2010 | Yanao | G05B 23/0237 702/183 |
| 2010/0332189 | A1 * | 12/2010 | Urmanov | G06F 11/3058 702/186 |
| 2011/0078513 | A1 * | 3/2011 | Beattie, Jr. | G06F 11/0706 714/47.2 |
| 2013/0156576 | A1 * | 6/2013 | Warren | H05K 7/20172 416/1 |
| 2013/0245980 | A1 * | 9/2013 | Forbes | G01F 1/72 702/86 |
| 2014/0111218 | A1 * | 4/2014 | Krishnamoorthy | G01M 99/00 324/511 |
| 2015/0152776 | A1 * | 6/2015 | Fischer | F01P 5/14 324/503 |
| 2016/0105652 | A1 * | 4/2016 | Yamashita | H04N 9/3144 348/333.1 |
| 2018/0215587 | A1 * | 8/2018 | Ranjan | B66B 11/0407 |
| 2018/0229971 | A1 * | 8/2018 | Ranjan | B66B 11/0407 |
| 2018/0309347 | A1 * | 10/2018 | Kusserow | B66B 11/043 |
| 2018/0327230 | A1 * | 11/2018 | Rasanen | H02K 11/33 |
| 2018/0346285 | A1 * | 12/2018 | Nagarajan | F24F 11/30 |
| 2019/0173396 | A1 * | 6/2019 | Arao | H02M 1/32 |
| 2020/0241520 | A1 * | 7/2020 | Gross | G05B 23/024 |

FOREIGN PATENT DOCUMENTS

| | | | |
|---|---|---|---|
| JP | 2016124648 A | * | 7/2016 |
| JP | 6306500 B2 | * | 4/2018 |
| WO | 2014193340 A1 | | 12/2014 |

* cited by examiner

3 DRIVE ENGINE 23 ELECTRIC MOTOR 27 FAN MOTOR 29 POWER SUPPLY CONTROL
33 SWITCH 39 TEMPERATURE SENSOR

DRIVE ENGINE ARRANGEMENT WITH SENSOR-MONITORED FAN FOR AN ELEVATOR SYSTEM

FIELD

The present invention relates to a drive engine arrangement for an elevator system and to an elevator system comprising such drive engine arrangement.

BACKGROUND

Elevators are generally applied for transporting persons or items within a building, typically in a vertical direction. Generally, an elevator system comprises an elevator car in which the persons or items may be transported and which may be displaced within the building for example along an elevator hoistway. The elevator car is suspended and displaced using suspension traction means (STM—sometimes also referred to as suspension traction media). Such suspension traction means may comprise one or more ropes or belts. On the one hand, such suspension traction means may hold the elevator car against gravitational forces, and on the other hand, the elevator car may be displaced by driving the suspension traction means using a drive engine.

Therein, the drive engine typically drives a traction sheave and the rotating traction sheave then drives the suspension traction means and thereby indirectly displaces the elevator car being suspended for example at one end of the suspension traction means. Typically, an opposite end of the suspension traction means is fixed to a counterweight which is then displaced within the elevator hoistway together with the elevator car but in an opposite direction.

The drive engine typically comprises an electric motor which directly or indirectly, e.g. via a gear, drives the traction sheave. The electric motor may transform electric energy into mechanical energy. During operating the elevator system, the drive engine has to provide significant mechanical power in order to be able to displace the car and, optionally, the counterweight. During such power generation, the drive engine heats to elevated temperatures due to some of the supplied electric energy being transformed into thermal energy.

In order to avoid any overheating of the drive engine, the drive engine is typically actively cooled. A common cooling approach is to provide the drive engine with a fan which generates a fluid flow such as an air flow circulating through portions of the drive engine in order to thereby dissipate some of the heat generated within the drive engine.

As overheating could damage portions of the drive engine, a reliable operation of such fan is indispensable. Accordingly, correct operation of the drive engine's fan should be ensured at all points in time during a lifetime of the elevator system.

Conventionally, in order to guarantee correct operation of the drive engine and its fan, maintenance personnel have to periodically check all components of the drive engine arrangement including the fan in order to be able to identify any defects and/or any signs of wear at an earliest possible stage.

However, such periodic maintenance requires significant efforts. For example, significant expenditure of human labor has to be provided by maintenance personnel as, typically, a person has to enter the elevator hoistway or any separate machine room in order to inspect and check the drive engine and all its components locally. Of course, such efforts result in significant costs. Furthermore, as there is typically a specific time span between such periodic maintenance procedures, there is a remaining risk that defects or deteriorations occur at the drive engine and are not detected promptly. Particularly, there may be a risk that a failure occurs at the fan and that due to insufficient cooling of the drive engine irreversible damages occur at the engine.

Accordingly, there may be a need for a drive engine arrangement and for an elevator system comprising such drive engine arrangement which enable a cost-effective and/or reliable way of monitoring an operability of the fan of the drive engine.

SUMMARY

According to a first aspect of the invention, a drive engine arrangement for an elevator system is proposed, the drive engine arrangement comprising a drive engine, a fan for cooling the drive engine and a fluid flow sensor. The drive engine is adapted for driving suspension traction means (STM) for displacing an elevator car. The fluid flow sensor is adapted for sensing a fluid flow generated by the fan.

Ideas underlying embodiments of the present invention may be interpreted as being based, inter alia, on the following observations and recognitions.

As described in the introductory portion above, an elevator system typically comprises a drive engine including an electric motor wherein an operation of the drive engine is generally controlled by an elevator control. Therein, the elevator control generally controls an electric energy supply to the drive engine such that the drive engine correctly drives the suspension traction means in order to thereby displace the elevator car in a required manner. Upon driving the suspension traction means, waste heat generated in the electric motor and/or other components of the drive engine has to be dissipated. Accordingly, the drive engine comprises the fan for generating a cooling fluid flow circulating through the drive engine in order to keep the drive engine's temperature below a predetermined limit. Typically, such fan has its own motor and may therefore operate independently from the drive engine's motor. An operation of the fan may be controlled by the elevator control also controlling the operation of the main motor of the drive engine. Alternatively, a separate controller may be provided. Typically, the fan is activated when a temperature in the drive engine exceeds a certain limit. Alternatively, the fan may be operated in accordance with a predetermined operation scheme.

However, in such conventional elevator system, no technical provisions are made in order to monitor a condition or status of the drive engine's fan. Particularly, no provisions are made for monitoring whether the drive engine's fan is correctly cooling the main motor and/or other heat-generating components of the drive engine.

In order to check such fan's condition or status, a maintenance person typically has to access the elevator system and personally check correct operation of its drive engine and its fan and/or other components for example by visual and/or manual inspection.

In order to avoid efforts required for such manual and local inspection, it is proposed herein to provide a specific fluid flow sensor for the drive engine's fan. Such fluid flow sensor may be a separate device and may be mechanically coupled to the drive engine. Such sensor may provide signals, preferably electric signals, which may be transmitted for example to a controller being provided at a remote location such that the drive engine's fan may be monitored from such remote location.

Thus, using the fluid flow sensor at the drive engine and evaluating its signals, a requirement for periodical manual inspection directly at the location of the drive engine may be avoided or reduced and, instead, the drive engine's fan may be monitored remotely.

For example, maintenance personnel may retrieve the signals of the fluid flow sensor and, by analyzing and evaluating such signals, may determine a condition or status of such fan without having to directly access the drive engine's location. Instead, the sensor's signals may be analyzed and evaluated remotely.

Alternatively, signals of the fluid flow sensor may be permanently or periodically transmitted to a controller, such controller being for example part of an elevator control or of a separate device. The controller may permanently or periodically monitor the condition or status of the drive engine's fan based on such signals and, if necessary, may initiate suitable steps for example in case any abnormal condition of the drive engine's fan is determined. Particularly, the fan's status or condition may be monitored automatically and/or remotely.

According to an embodiment, the fluid flow sensor comprises a deflectable flap arranged in a path of the fluid flow generated by the fan. Such flap may be moved or deflected between a closed state and an open state. In the closed state, the flap blocks or at least significantly hinders a fluid flow through the fluid flow sensor. In the open state, such fluid flow is unblocked or at least less hindered.

Generally, the deflectable flap is mechanically biased towards the closed state, i.e. as long as no external forces act onto the flap, it will remain in the closed state. However, being arranged in the path of the fluid flow generated by the fan of the drive engine, the flap may be deflected into its open state upon a fluid flow generated by the fan flowing and pressing against the flap and pressing it into its open state.

In other words, while there is no or only a minor fluid flow generated by the fan, the deflectable flap of the fluid flow sensor will remain in its closed state. However, when a significant fluid flow is generated by the fan, this fluid flow may press the deflectable flap into its open state. The mechanical biasing may be established e.g. by a spring or other elastic element being connected to a portion of the deflectable flap.

Accordingly, by analyzing the status or positioning of the deflectable flap, information about an operation mode of the drive engine's fan may be derived, the closed flap indicating no current operation of the fan whereas an opened flap indicating current operation of the fan.

The flap may be integrated into the fluid flow sensor. The flap may be made from a metal or plastic sheet or from any other suitable material. The flap may have a profile for increasing its sensitivity to the fluid flow.

According to an embodiment, the fluid flow sensor comprises a switch to be activated upon deflection of the deflectable flap. In other words, a switch is provided in the fluid flow sensor, such switch changing its switching state upon the flap of the fluid flow sensor changing its deflection state. For example, when the flap is in its closed state, the switch may be in its activated state, whereas when the flap is in its open state, the switch may be in its deactivated state, or vice versa. An activation state of the switch may be readout electrically, i.e. the switch may be for example electrically conductive in its closed state and electrically isolating in its open state, or vice versa.

The switch may be simple key button which may be mechanically pressed and depressed in order to change its switching state. In such example, the deflectable flap of the fluid flow sensor may be adapted and arranged such that upon changing the flap's deflection state, the flap may activate or deactivate the switch correspondingly. Accordingly, by reading out the switching state of the switch, information about the flap's positioning may be derived, such information implicitly including information about an activity status of the drive engine's fan.

Alternatively, the switch may be provided e.g. with a reed switch to be activated and deactivated by a magnet coming into close proximity to the switch. In such example, the magnet may be attached to the deflectable flap of the fluid flow sensor such that this magnet comes into close proximity to the reed switch upon the flap being in one of its open or closed state whereas the magnet departs from the reed switch upon changing its deflection towards the closed or open state, respectively. Again, by reading out the switching state of the switch, information about the flaps positioning may be derived, such information indicating the activity status of the fan of the drive engine.

Preferably, the switch is a simple binary switch having only two switching states, i.e. a non-activated state and an activated state. However, in an alternative embodiment, the switch may have more than two distinct switching states or may change its switching states continuously.

According to an embodiment, the drive engine comprises a housing and the fluid flow sensor is attached to the housing. In other words, components of the drive engine such as its electric motor and its fan are provided at or within the housing. Preferably, all components of the drive engine are comprised within the housing such that the housing encloses all these components thereby forming one single unit. The fluid flow sensor may then be provided as a separate unit to be attached to the housing of the drive engine.

Particularly, the housing of the drive engine may have ventilation openings or ventilation slots through which a fluid flow generated by the engine's fan may circulate. The fluid flow sensor may be attached to the housing adjacent to one or more of such openings or slots such that the fluid flow generated by the engine's fan is also circulated through or along the fluid flow sensor.

Preferably, according to an embodiment, the fluid flow sensor is attached to an outside surface of the housing. In other words, the fluid flow sensor may be provided externally to the drive engine's housing and in mechanical contact with its outside surface. Such arranging of the fluid flow sensor externally to the drive engine's housing may be beneficial in that the fluid flow sensor may be accessed from outside the drive engine. Accordingly, the fluid flow sensor may be installed, repaired and/or replaced for example without having to open the drive engine's housing. Thus, there is a decreased risk of for example damaging any components of the drive engine within its housing and/or harming any maintenance personnel for example by an electric shock or by mechanical contact with rotating parts of the drive engine.

Particularly, the fluid flow sensor may be retrofitted at an existing drive engine without necessarily precisely knowing any technical details of the drive engine. Thus, by coupling a specific fluid flow sensor to the drive engine, even fans of drive engines of elevator systems of another manufacturer may be monitored in order to detect any abnormal conditions.

Specifically, according to an embodiment, a circuitry of the fluid flow sensor is separated from a circuitry of the drive engine. In other words, any electric connections to the fluid flow sensor may be separate from electric connections to the drive engine, particularly separate from electric connections to the drive engine's fan. Accordingly, while the fluid flow sensor and the drive engine are coupled mechanically after the sensor is mounted to the drive engine, the fluid flow sensor and the drive engine are originally and functionally two separate units, each having its own electric circuitry and being electrically independent from the other unit. Accordingly, the fluid flow sensor may be mounted, repaired, replaced and/or retrofitted to the drive engine independent of the drive engine's operation. Particularly, the drive engine's operation does not necessarily have to be interrupted during a repairing, replacing or retrofitting action.

According to another embodiment, the drive engine arrangement further comprises a temperature sensor being adapted for measuring a temperature in the drive engine. Such temperature sensor may be attached to the housing of the drive engine. Particularly, the temperature sensor may be in thermal contact with the drive engine's housing such that a temperature of the housing may be measured.

By measuring such drive engine's temperature, it may be derived e.g. whether the drive engine is currently at a temperature above a predetermined temperature limit at which the fan typically operates in order to dissipate thermal energy from the drive engine. If the fan is not operating although the drive engine being at such elevated temperature, there is a high probability of the fan or its control being defect or malfunctioning.

According to a second aspect of the present invention, an elevator system is proposed to comprise a drive engine arrangement according to an embodiment of the above described first aspect of the invention. Furthermore, the elevator system comprises a controller. This controller is adapted for determining an operation status of the fan of the drive engine based on signals from the fluid flow sensor of the drive engine arrangement.

In other words, by providing the above described drive engine arrangement together with a specific controller to an elevator system, an operation status of the fan of the drive engine may be permanently or periodically and preferably automatically determined by the controller based on signals from the fluid flow sensor comprised in the drive engine arrangement. Accordingly, in case the controller determines any critical operation status indicating for example a defect of the drive engine's fan, suitable countermeasures may be initiated. Such countermeasures could be for example sending an information or a request to maintenance personnel, outputting an alarm or even setting the elevator system into an idle mode.

According to an embodiment, the controller is arranged at a remote position or accessible from a remote position with respect to the drive engine. In other words, while the fluid flow sensor is preferably directly mechanically coupled to the drive engine, the controller may be provided at a different position for example remote to the location of the drive engine or may at least be accessed from such remote position. The remote position may be e.g. a portion of the building which is separated from the hoistway and/or machine room of the elevator system. For example, the remote position may be in a control room. Alternatively, the remote position may be located at a place external to the building comprising the elevator system. Accordingly, signals from the fluid flow sensor may be analyzed by the controller and may be provided to such remote position. Thereby, remote monitoring of the drive engine arrangement including the operation of the fan of the drive engine may be enabled. Accordingly, no direct access of for example maintenance personnel to the drive engine may be necessary in order to monitor the drive engine's fan correct operation.

According to an embodiment, the controller is adapted for determining the operation status of the fan based on a comparison of current signals from the fluid flow sensor with a reference signal value, multiple reference signal values, a time pattern of reference signals and/or a reference signal range.

In other words, the controller may derive information about the operation status of the fan by comparing current signals from the fluid flow sensor with one or more reference signal values, with a time pattern of reference signals or with a reference signal range.

For example, the fluid flow sensor may provide information about a time-dependent activation of the fan. Each time the fan is activated the fluid flow sensor provides a corresponding signal. Typically, during normal operation, the fan is activated and deactivated several times when the drive engine is operated during extended durations. From a time-dependent pattern with which the fan is operated and stopped again, information about an operation status of the fan may be derived.

For example, when the fan is defect or malfunctioning, no activity of the fan may be detected at all or only a reduced activity may be detected. Alternatively, when the fan is still operating but is activated with a certain time-delay, it may be assumed that the fan is slightly damaged and, sooner or later, may completely fail.

Preferably, according to an embodiment, the controller is adapted for determining the reference signal value, the multiple reference signal values, the time-dependent pattern of reference signals and/or the reference signal range during a learning procedure by operating the drive engine in a predetermined operation state and acquiring signals from the sensor during such operation.

In other words, a learning procedure may be performed in a predetermined operation state of the drive engine in which for example the operation status of the drive engine's fan is known. For example, the learning procedure may be performed directly after installing the elevator system and precisely checking its correct function. In such initial operating state, the operation status of the fan is assumed to be in a perfect or at least an acceptable range. In such predetermined operation state, the learning procedure may be performed by acquiring signals from the fluid flow sensor, such signals indicating when and/or at which time intervals the fan is activated and deactivated. From such acquired sensor signals, the one or more reference signal values, the pattern of reference signals and/or the reference signal range may be derived and stored for comparison purposes during later operation of the elevator system.

During such later operation, the controller may then compare current signals from the fluid flow sensor with the initially acquired reference signal values or ranges and may for example determine whether the drive engine's fan still operates within acceptable conditions. Specifically, the controller may for example determine whether e.g. the fan correctly starts to operate at predetermined environmental conditions.

According to an embodiment the controller is furthermore, in determining the operation status of the fan, adapted for taking into account signals received from a temperature sensor of the drive engine arrangement.

In other words, when the controller determines the operation status of the fan, it is not or not only taken into account when and/or at which time intervals the fan is activated and deactivated but, instead or additionally, a temperature of the drive engine is measured using the temperature sensor and the measurement results are taken into account for determining whether or not the fan is in an acceptable condition or whether it may need some maintenance. For example, when a high temperature level is detected at the drive engine, such temperature level being significantly higher than a temperature at which the fan should normally start its operation, it may be assumed that there is a defect at the fan or at its control device and that measure have to be initiated in order to avoid any further heating of the drive engine as a result of lacking cooling action of the fan.

According to an embodiment, the controller is furthermore adapted for, in determining the operation status of the fan, taking into account signals received from an elevator control of the elevator system.

For example, from such signals of the elevator control, the controller may derive how long the drive engine is already activated. From predetermined data or from previous investigation, the controller may furthermore know that after a certain time span of operating the drive engine's motor the drive engine reaches a temperature at which the fan should be operated in order to effect sufficient heat dissipation. If no activity of the fan is detected after such time span, it may be assumed that there is an abnormal operation status of the fan requiring some maintenance.

According to a third aspect of the present invention, a method of operating an elevator system according to an embodiment of the above-mentioned second aspect is provided, the method comprising the step of determining an operation status of the fan based on signals received from the fluid flow sensor of the drive engine arrangement.

Preferably, such method may be performed automatically, i.e. without any necessary interaction with human maintenance personnel. Furthermore, preferably, such method may enable remotely controlling or monitoring the operation status of the fan of the drive engine.

Optionally, the method may be implemented in software, i.e. with a computer program product including computer-readable instructions which, when performed by a programmable machine such as a processor of a programmable elevator controller, instruct or control performing the above defined method. Such software may be stored on a computer-readable medium such as a CD, a DVD, flash memory, etc. such that the software may be uploaded into a programmable machine in order to thereby enable the machine for performing or controlling the above-mentioned method.

It shall be noted that possible features and advantages of embodiments of the invention are described herein partly with respect to a drive engine arrangement, partly with respect to an elevator system comprising such drive engine arrangement and partly with respect to a method for operating such elevator system. One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawings. However, neither the drawings nor the description shall be interpreted as limiting the invention.

The figures are only schematic and not to scale. Same reference signs refer to same or similar features throughout the figures.

DETAILED DESCRIPTION

Figure 1:
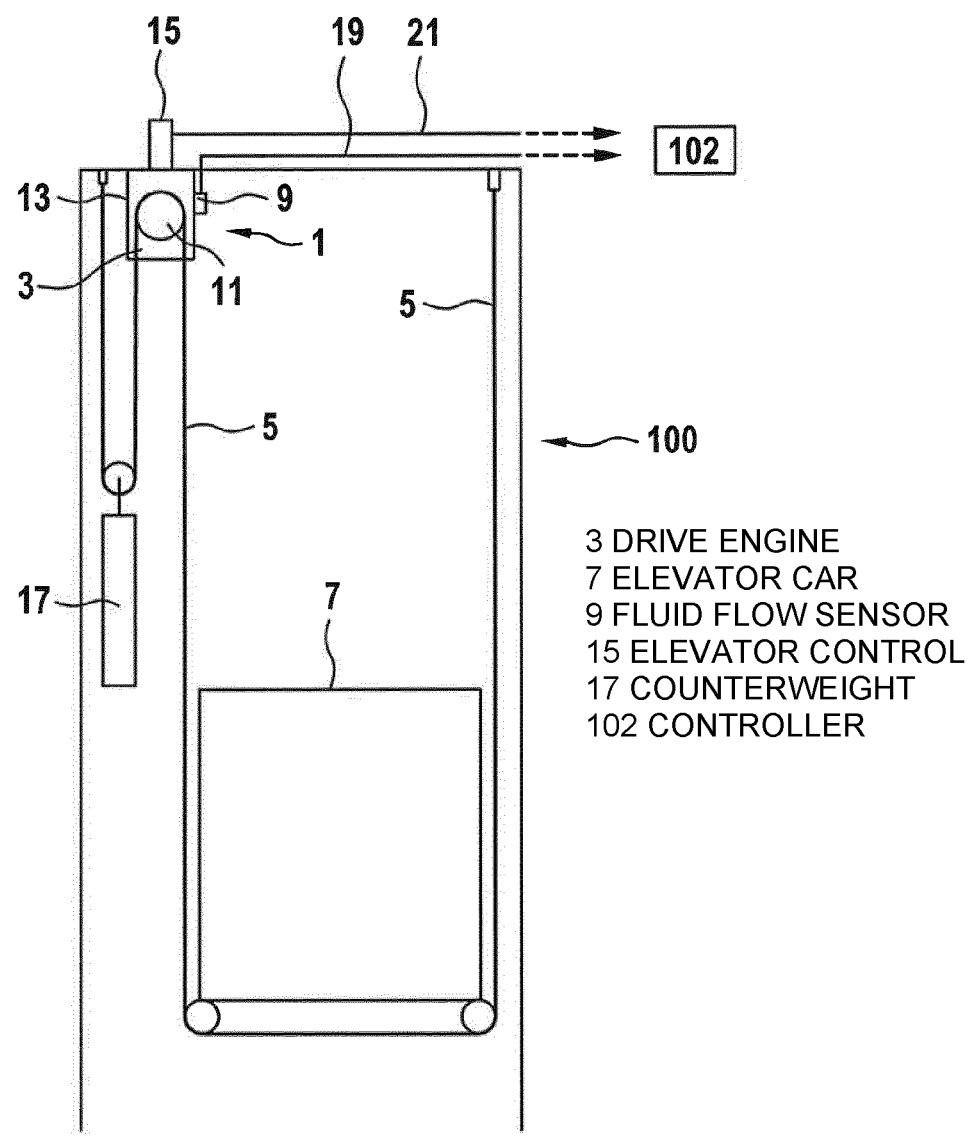
FIG. 1 shows an elevator system comprising a drive engine arrangement according to an embodiment of the present invention.

FIG. 1 shows an elevator system 100 comprising a drive engine arrangement 1 according to an embodiment of the present invention. The drive engine arrangement 1 comprises a drive engine 3 in which an electric motor (not explicitly shown in FIG. 1) drives a traction sheave 11 into rotating motion. The traction sheave 11 drives a suspension traction means 5 such as one or more belts or ropes. The suspension traction means 5 suspends an elevator car 7 as well as a counterweight 17. An operation of the drive engine 3 is controlled by an elevator control 15 in communication with a controller 102 via a signal transmission line 21.

The drive engine arrangement 1 furthermore comprises a fluid flow sensor 9. The fluid flow sensor 9 is directly and mechanically coupled to the drive engine 3. Preferably, the fluid flow sensor 9 is attached to an outside surface of a housing 13 enclosing the drive engine's 3 components such as its electric motor. Signals from the fluid flow sensor 9 are transmitted to a controller 102 via a signal transmission line 19, such controller 102 being positioned remotely from the drive engine 3.

While the visualization of FIG. 1 shows the fluid flow sensor 9 to be disposed at a side of the drive engine's 3 housing 13, this is mainly for ease of visualization. In principle, the fluid flow sensor 9 may be disposed at any suitable location at the drive engine 3 as long as it is in the fluid flow generated by the drive engine's fan (not shown in FIG. 1). However, in most implementations, the drive engine's fan is disposed at a rear side of the drive engine 3, i.e. a side opposite to the side at which the traction sheave 11 is disposed, such as to generate a fluid flow through the drive engine 3 in parallel to the drive engine's longitudinal axis. Accordingly, it may be preferable to attach the fluid flow sensor 9 to a surface of the housing 13 at the rear side of the drive engine 3.

Figure 2:
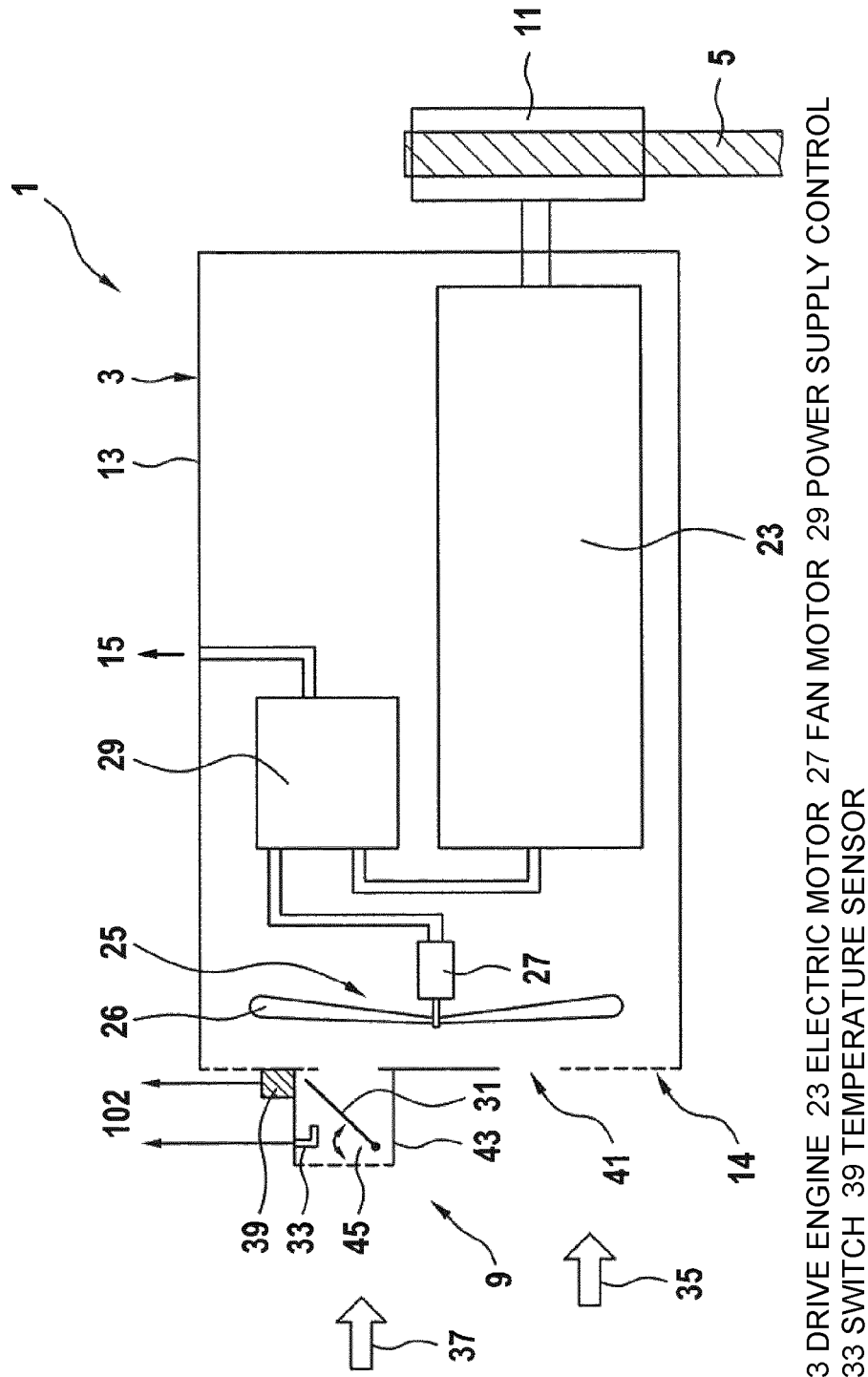
FIG. 2 show a cross sectional side view through a drive engine according to an embodiment of the present invention.

FIG. 2 shows a cross-sectional view through a drive engine arrangement 1 in according to such embodiment. The drive engine 3 comprises a main electric motor 23 and a power supply control 29. The main electric motor 23 is mechanically connected to the sheave 11 for driving the suspension traction means 5. The drive engine 3 furthermore comprises the fan 25. The fan 25 comprises a small electric motor 27 and fan blades 26 driven by the motor 27 into rotating motion upon operating the fan 25. All these components, i.e. the main electric motor 23, the power supply control 29 and the fan 25, are comprised in and enclosed by the housing 13. At a rear side 14, the housing 13 comprises several openings and slots 41. Through these openings and slots 41, a fluid such as air from an environment may enter into the housing 13. Accordingly, upon operating the fan 25, a fluid flow 35 may be drawn into the housing 13 and flow along components comprised in the housing in order to absorb heat, i.e. in order to actively cool these components. The fluid flow 35 may then leave the housing 13 through other openings or slots (not shown).

The fluid flow sensor 9 is attached to the surface at the rear side 14 of the housing 13 in a region adjacent to one of the openings or slots 41. The sensor 9 comprises a housing 43 having openings or slots at an entrance side 45 as well as at an opposite exit side abutting to the housing 13 of the drive engine 3. Accordingly, when the fan 25 is operated, a portion 37 of the fluid flow 35 generated by the fan 25 is drawn through the fluid flow sensor 9.

Inside the housing 43, the fluid flow sensor 9 comprises the deflectable flap 31. This deflectable flap 31 is hinged at one end while being deflectable with the other end. Furthermore, the fluid flow sensor 9 comprises a switch 33 which may be activated and deactivated, respectively, upon the deflectable flap 31 being moved from an open state to the closed state, or vice versa. Accordingly, the deflectable flap 31, in its closed state, may come into mechanical contact with the switch 33 or at least may come close to the switch 33 such as to activate/deactivate it, whereas in its open state, the flap 31 is positioned away from the switch 33 such as to deactivate/activate it. Without external forces being applied to the flap 31, the flap 31 is biased towards its closed state in which it significantly hinders a fluid flow 37 through the fluid flow sensor 9.

Accordingly, when the fan 25 is operated and draws the portion 37 of the fluid flow 35 through the fluid flow sensor 9, the flap 31 is deflected from its closed state into its open state. Such deflection of the flap 31 occurring upon correct operation of the fan 25 may then be remotely detected from a signal generated by the switch 33.

For monitoring correct operability of the fan 25, it may have been determined during a preceding learning procedure how the fan 25 typically behaves during correct operation, i.e. as long as no defect or failure occurs. For example, the learning procedure may be performed after installing the elevator system. Therein, the drive engine 3 may be operated in accordance with specified operation characteristics and it may be observed how the fan 25 is activated and deactivated during such specified operation. Typically, the fan's 25 operation depends on the current temperature of the main motor 23, the supply control 29 and/or other components comprised in the drive engine 3, wherein the temperature of these components generally depends on a duration and/or power requirements with which these components are operated. Accordingly, typical time-dependent patterns of activating and deactivating the fan 25 may occur. Such patterns may then be used as time patterns of reference signals. During subsequent normal operation of the elevator system, any currently occurring activation and deactivation of the fan 25 detected using the fluid flow sensor 9 may then for example be compared to such previously acquired time patterns of reference signals.

Alternatively or additionally, the fluid flow sensor 9 may comprise the temperature sensor 39 with which a temperature of the drive engine 3 may be measured. For example, such temperature sensor 39 may directly abut to the housing 13 of the drive engine 3. In a preceding learning procedure or, alternatively, through other experiments, simulations or calculations, it may be determined at which temperature measured by the temperature sensor 39 the fan 25 typically starts to operate. During actual operation of the drive engine 3, temperatures measured by the temperature sensor 39 may then be compared to such previously acquired reference signals and additionally it may be determined whether or not the fan 25 is operated, such determination being enabled due to the fluid flow sensor 9. Accordingly, for example in a case where an excessive temperature of the drive engine 3 is detected but no activation of the fan 25 is observed, it may be assumed that some defect or malfunction of the fan 25 has occurred.

In contrast to conventional elevator systems in which no drive-engine-borne measurement instrument was provided for monitoring the fan's operation, the elevator system 100 with the drive engine arrangement 1 proposed herein enables, inter alia, a fine-tuning of a drive installation via sensor measurements. Furthermore, monitoring of the drive engine's fan during operation may be enabled without any human observer being necessary. The elevator system 100 proposed herein is ready for remote monitoring. Furthermore, the elevator system 100 and its drive engine arrangement 1 may be configurable in that feature computation from sensor raw signals may be changed "on-the-fly", i.e. via software. As proposed herein, also existing elevator installations or third party drive engines may be monitored by attaching a sensor to the drive engine's fan.

Finally, it should be noted that terms such as "comprising" do not exclude other elements or steps and terms such as "a" or "an" do not exclude a plurality. Also elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS 1 drive engine arrangement
3 drive engine
5 suspension traction means
7 elevator car
9 fluid flow sensor
11 traction sheave
13 housing of drive engine
14 rear side of housing
15 elevator control
17 counterweight
19 transmission line
21 transmission line
23 electric motor
25 fan
26 fan blade
27 fan motor
29 drive engine's power supply control
31 flap
33 switch
35 fluid flow through fan
37 fluid flow through sensor
39 temperature sensor
41 opening/slot
43 housing of fluid flow sensor
45 entrance side
100 elevator system
102 controller

The invention claimed is:

1. A drive engine arrangement for an elevator system comprising:
   a drive engine for driving suspension traction means for displacing an elevator car;
   a fan generating a fluid flow cooling the drive engine; and
   a fluid flow sensor sensing the fluid flow generated by the fan and generating an indication of an operating condition of the fan based upon the sensed fluid flow.

2. The drive engine arrangement according to claim 1 wherein the fluid flow sensor includes a deflectable flap arranged in a path of the fluid flow generated by the fan.

3. The drive engine arrangement according to claim 2 wherein the fluid flow sensor includes a switch activated by deflection of the deflectable flap.

4. The drive engine arrangement according to claim 1 wherein the drive engine includes a housing and the fluid flow sensor is attached to the housing.

5. The drive engine arrangement according to claim 4 wherein the fluid flow sensor is attached to an outside surface of the housing.

6. The drive engine arrangement according to claim 1 wherein an electrical circuitry of the fluid flow sensor is separated from an electrical circuitry of the drive engine.

7. The drive engine arrangement according to claim 1 including a temperature sensor measuring a temperature in the drive engine.

8. An elevator system comprising:
a drive engine arrangement including a drive engine for driving suspension traction means for displacing an elevator car of the elevator system, a fan generating a fluid flow cooling the drive engine, and a fluid flow sensor sensing the fluid flow generated by the fan and generating a signal representing an operating condition of the fan based upon the sensed fluid flow; and
a controller for determining an operation status of the fan based upon the signal received from the fluid flow sensor.

9. The elevator system according to claim 8 wherein the controller is arranged at a remote position from the drive engine.

10. The elevator system according to claim 8 wherein the controller determines the operation status of the fan based on a comparison of a current one of the signal from the fluid flow sensor with at least one of a reference signal value, multiple reference signal values, a time pattern of reference signals and a reference signal range.

11. The elevator system according to claim 8 wherein the controller determines the operation status of the fan taking into account a signal received from a temperature sensor at the drive engine arrangement.

12. The elevator system according to claim 8 wherein the controller determines the operation status of the fan taking into account signals received from an elevator control of the elevator system.

13. A method of operating an elevator system according to claim 8, the method comprising the steps of:
operating the fan to generate the fluid flow;
operating the controller to determine an operation status of the fan based on the signal received from the fluid flow sensor of the drive engine arrangement; and
initiating a countermeasure when the controller determines that the operation status is a critical operation status.

14. The method according to claim 13 including prior to the step of determining retrofitting the fluid flow sensor to the drive engine of the elevator system.

15. An elevator system comprising:
a drive engine arrangement including a drive engine for driving suspension traction means for displacing an elevator car of the elevator system, a fan for generating a fluid flow for cooling the drive engine, and a fluid flow sensor sensing the fluid flow generated by the fan and generating a signal representing an operating condition of the fan based upon the sensed fluid flow;
a controller for determining an operation status of the fan based upon the signal received from the fluid flow sensor;
wherein the controller determines the operation status of the fan based on a comparison of a current one of the signal from the fluid flow sensor with at least one of a reference signal value, multiple reference signal values, a time pattern of reference signals and a reference signal range; and
wherein the controller determines at least one of the reference signal value, the multiple reference signal values, the time pattern of reference signals and the reference signal range during a learning procedure by operating the drive engine in a predetermined operation state and acquiring the signal from the fluid flow sensor during such operation.

\* \* \* \* \*